United States Patent
Nascimento Junior et al.

(10) Patent No.: US 12,418,844 B2
(45) Date of Patent: Sep. 16, 2025

(54) METHODS, SYSTEM AND ACCESS POINT OF A WLAN FOR HANDLING A WIRELESS DEVICE CONNECTED TO AN ACCESS POINT

(71) Applicant: Telefonaktiebolaget LM Ericsson (publ), Stockholm (SE)

(72) Inventors: Amadeu Nascimento Junior, Indaiatuba (BR); Maria Valéria Marquezini, Indaiatuba (BR); André Mendes Cavalcante, Indaiatuba SP (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 389 days.

(21) Appl. No.: 18/023,153

(22) PCT Filed: Aug. 25, 2020

(86) PCT No.: PCT/SE2020/050812
§ 371 (c)(1),
(2) Date: Feb. 24, 2023

(87) PCT Pub. No.: WO2022/045936
PCT Pub. Date: Mar. 3, 2022

(65) Prior Publication Data
US 2023/0319666 A1    Oct. 5, 2023

(51) Int. Cl.
*H04W 36/00* (2009.01)
*H04W 36/08* (2009.01)
(Continued)

(52) U.S. Cl.
CPC ..... *H04W 36/00833* (2023.05); *H04W 36/08* (2013.01); *H04W 36/1446* (2023.05);
(Continued)

(58) Field of Classification Search
CPC ....... H04W 36/00833; H04W 36/1446; H04W 36/08
See application file for complete search history.

(56) References Cited

U.S. PATENT DOCUMENTS

| 10,939,367 B1 | 3/2021 | Koshy et al. |
| 2009/0156210 A1 | 6/2009 | Ponce et al. |
| (Continued) | | |

OTHER PUBLICATIONS

Berg, Johannes Alexander, "WiFi to LTE handover in mobile phones", Department of Informatics Faculty of mathematics and natural sciences, University of Oslo, Spring 2019, 1-76.

*Primary Examiner* — Justin Y Lee
(74) *Attorney, Agent, or Firm* — Murphy, Bilak, Homiller, PLLC

(57) ABSTRACT

Disclosed is a method performed by an access point, AP (120), of a WLAN (125), for handling a wireless device (140) connected to the AP (120). The method comprises obtaining information on signal quality of signals sent between the AP (120) and the wireless device (140), and when the obtained information on signal quality reveals that the signal quality is below a signal quality threshold, determining a current value of a wireless device characteristic. The method further comprises obtaining, from a pre-emptive handover system (150), an estimation of a likelihood of the wireless device (140) disconnecting from the WLAN for the current value of the wireless device characteristic, wherein the likelihood was determined from statistical information of earlier handling of the wireless device (140) by the AP (120) for different values of the wireless device characteristics. Further, when the received estimation of likelihood is above a likelihood threshold, accelerating a handover process of the wireless device (140) connection from the AP (120) to a network node (130) of a cellular communication network (100).

16 Claims, 6 Drawing Sheets

(51) Int. Cl.
  *H04W 36/14* (2009.01)
  *H04W 36/30* (2009.01)
  *H04W 84/12* (2009.01)
  *H04W 88/06* (2009.01)

(52) U.S. Cl.
  CPC ............... *H04W 36/00837* (2018.08); *H04W 36/00838* (2023.05); *H04W 36/302* (2023.05); *H04W 84/12* (2013.01); *H04W 88/06* (2013.01)

(56) References Cited

U.S. PATENT DOCUMENTS

| | | |
|---|---|---|
| 2015/0319660 A1 | 11/2015 | Helbert |
| 2019/0098532 A1 | 3/2019 | Rawat et al. |
| 2019/0289505 A1* | 9/2019 | Thomas ................ H04W 36/32 |
| 2021/0105691 A1* | 4/2021 | Zhu ..................... H04L 65/1016 |

* cited by examiner

METHODS, SYSTEM AND ACCESS POINT OF A WLAN FOR HANDLING A WIRELESS DEVICE CONNECTED TO AN ACCESS POINT

TECHNICAL FIELD

The present disclosure relates generally to methods, systems and access points, AP, of a wireless local area network, WLAN, for handling a wireless device connected to the AP. More specifically, the present disclosure relates to a method of an AP, and an AP for handling a wireless device depending on likelihood of the wireless device disconnecting from the WLAN for a current value of a wireless device characteristic. Likewise, the present disclosure relates to a method of a pre-emptive handover system and such a system for determining the likelihood of the wireless device disconnecting from the WLAN for different values of the wireless device characteristics. The present disclosure further relates to computer programs and carriers corresponding to the above methods, access points and systems.

BACKGROUND

Today, many wireless communication devices, aka wireless devices or mobile devices, such as laptops and smartphones have access to both WLANs and cellular communication networks such as 4G and 5G at the same time. Due to cellular offloading and cost aspects, data connections are preferred to be assigned to WLANs, aka Wi-Fi networks, when both technologies are present. However, to try to guarantee data connections at good levels in terms of reliability and performance, many mobile devices already include the ability to automatically switch from a Wi-Fi network to a cellular communication network when the assigned Wi-Fi network becomes unstable. This procedure, referred to as Wi-Fi to cellular handover (HO), is not optimal and sometimes gets stuck on poor Wi-Fi networks even when the most aggressive HO settings are applied. This situation can produce low Quality-of-Experience (QoE) and increase the Wi-Fi network signaling, mainly in managed deployments.

Methods for improving HO from Wi-Fi to cellular network are widely available nowadays, see for example "WiFi to LTE handover in mobile phones", by Berg, Johannes Alexander, Department of Informatics, Faculty of mathematics and natural sciences, University of Oslo, Spring 2019 [1]. However, the known methods are reactive and triggered only by degradation of some specific performance or signal quality metric such as, delay, packet loss, throughput and signal strength. As a result, there is a risk of low QoE by the user of the wireless device in connection with possible Wi-Fi to cellular handovers.

Consequently, there is a need for a solution that improves QoE in connection with possible WLAN to cellular network handovers.

SUMMARY

It is an object of the invention to address at least some of the problems and issues outlined above and in the Detailed description. It is possible to achieve any of these objects and possibly others by using methods, APs and systems as defined in the attached independent claims.

According to one aspect, a method is provided that is performed by an AP of a WLAN for handling a wireless device connected to the AP. The method comprises obtaining information on signal quality of signals sent between the AP and the wireless device, and when the obtained information on signal quality reveals that the signal quality is below a signal quality threshold, determining a current value of a wireless device characteristic. The method further comprises sending, to a pre-emptive handover system, a request for information on likelihood of the wireless device disconnecting from the WLAN for the current value of the wireless device characteristic. The method further comprises receiving, from the pre-emptive handover system and in response to the request, an estimation of the likelihood of the wireless device disconnecting from the WLAN for the current value of the wireless device characteristic, wherein the likelihood was determined from statistical information of earlier handling of the wireless device by the AP for different values of the wireless device characteristics, and when the received estimation of likelihood is above a likelihood threshold, anticipating WLAN regular procedures for a faster handover process of the wireless device connection from the AP to a network node of a cellular communication network.

According to another aspect, a method is provided that is performed by a pre-emptive handover system for determining a likelihood of a wireless device connected to an AP of a WLAN disconnecting from the WLAN. The method comprises receiving, from the AP at each of a plurality of occasions, a value of a wireless device characteristic for the wireless device together with WLAN connection characteristics, indicating whether the WLAN connection of the wireless device was lost or kept in connection with the value of the wireless device characteristic. The method further comprises determining the likelihood of the wireless device disconnecting from the WLAN for different values of the wireless device characteristic, based on the received WLAN connection characteristics and the values of the wireless device characteristic, and in response to a request from the AP regarding a certain value of the wireless device characteristic, sending to the AP, information on the determined likelihood of the wireless device disconnecting from the WLAN for the certain value.

According to another aspect, an AP is provided that is operable in a WLAN, the AP being configured for handling a wireless device connected to the AP. The AP comprises a processing circuitry and a memory. Said memory contains instructions executable by said processing circuitry, whereby the AP is operative for obtaining information on signal quality of signals sent between the AP and the wireless device, and when the obtained information on signal quality reveals that the signal quality is below a signal quality threshold, determining a current value of a wireless device characteristic. The AP is further operative for sending, to a pre-emptive handover system, a request for information on likelihood of the wireless device disconnecting from the WLAN for the current value of the wireless device characteristic, and receiving, from the pre-emptive handover system and in response to the request, an estimation of the likelihood of the wireless device disconnecting from the WLAN for the current value of the wireless device characteristic, wherein the likelihood was determined from statistical information of earlier handling of the wireless device by the AP for different values of the wireless device characteristics. Further, the AP is operative for, when the received estimation of likelihood is above a likelihood threshold, anticipating WLAN regular procedures for a faster handover process of the wireless device connection from the AP to a network node of a cellular communication network.

According to another aspect, a pre-emptive handover system is provided, which is configured for determining a likelihood of a wireless device connected to an AP of a WLAN disconnecting from the WLAN. The pre-emptive handover system comprises a processing circuitry and a memory. Said memory contains instructions executable by said processing circuitry, whereby the pre-emptive handover system is operative for receiving, from the AP at each of a plurality of occasions, a value of a wireless device characteristic for the wireless device together with WLAN connection characteristics indicating whether the WLAN connection of the wireless device was lost or kept in connection with the value of the wireless device characteristic, determining the likelihood of the wireless device disconnecting from the WLAN for different values of the wireless device characteristic, based on the received WLAN connection characteristics and the values of the wireless device characteristic, and in response to a request from the AP regarding a certain value of the wireless device characteristic, sending to the AP, information on the determined likelihood of the wireless device disconnecting from the WLAN for the certain value.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
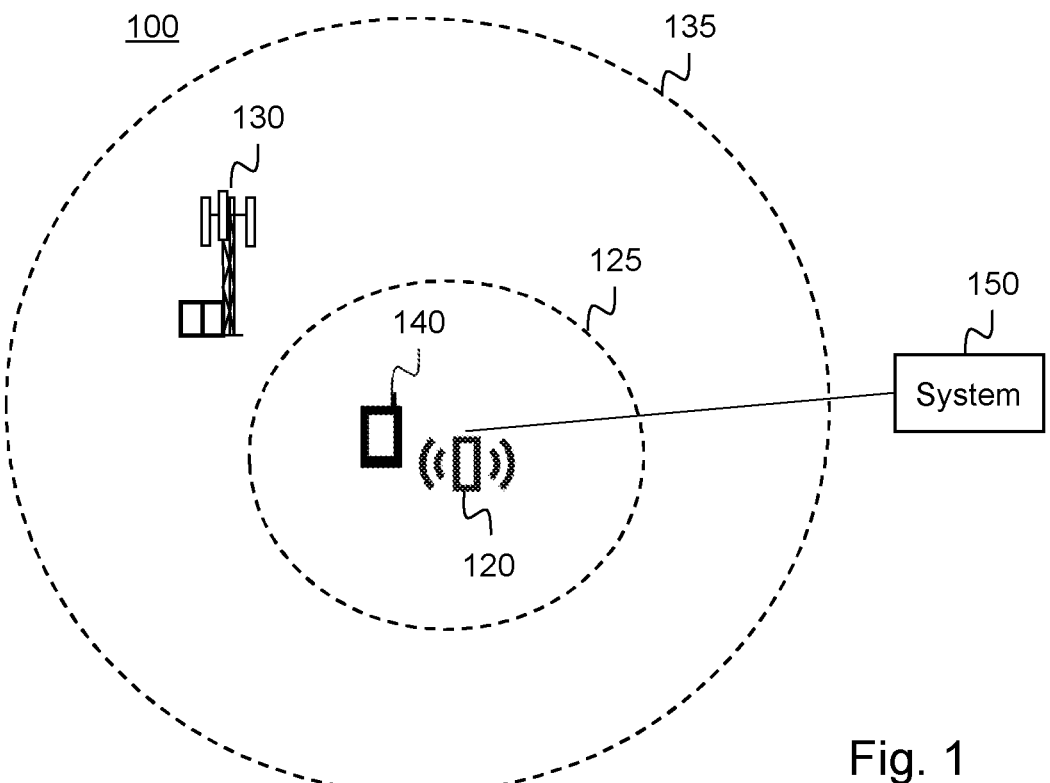
FIG. 1 is a communication scenario in which the present invention can be used.

FIG. 1 shows a scenario in which the present invention may be used. A wireless/cellular communication network 100 comprises a radio access network (RAN) node 130 that is in, or is adapted for, wireless communication with a wireless communication device aka wireless device 140. The RAN node 130 provides cellular network connectivity in a geographical cell 135. At least partly within this cell 135, there is a WLAN 125. The WLAN 125 comprises an AP 120 that provides WLAN connectivity in a geographical WLAN cell. The WLAN cell typically covers a house and the immediate surroundings of the house. According to the invention, FIG. 1 also shows a pre-emptive handover system 150, to which the AP 120 has access. The function of the pre-emptive handover system 150 will be described further down.

The wireless communication network 100 may be any kind of wireless communication network that can provide cellular radio access to wireless devices. Examples of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Worldwide Interoperability for Microwave Access (WiMAX), WiMAX Advanced, as well as fifth generation wireless communication networks based on technology such as New Radio (NR).

The RAN node 130 may be any kind of network node that provides wireless cellular access to a wireless device 140 alone or in combination with another network node. Examples of radio access network nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, a remote radio unit (RRU), a remote radio head (RRH) and a multi-standard BS (MSR BS).

The wireless device 140 may be any type of device capable of wirelessly communicating with a RAN node 130 and an AP using radio signals. In other words, the wireless device has both cellular access ability and WLAN access ability. The wireless device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

The term "handover" is used herein to refer to when wireless devices 140 switch from the WLAN 125 to the cellular communication network 100. It is sometimes referred to in the literature as a vertical handover. The term "band steering" is defined as a technique used in dual-band WLAN deployments to encourage WLAN dual-band enabled wireless devices to change from one WLAN frequency band to another WLAN frequency band. For example, the wireless device 140 may be instructed to use the less congested and higher capacity 5 GHz band, leaving the more crowded 2.4 GHz band available for legacy devices. This is usually advantageous because 5 GHz tends to be better for WLAN performance as it has more and wider communication channels available with less overall interference from both neighboring WLAN sources and non-WLAN sources. However, the 5 GHz band has a smaller coverage than the 2.4 GHz, therefore the band steering also tries to move wireless devices from the 5 GHz to 2.4 GHz when the devices have low signal strength. Thus, band steering improves end user experience by balancing channel utilization and coverage. The term "Handover time/delay" is a measure of the total time of the handover process, from initiation to completion. The term "Handover triggers" are defined as conditions that should be met for HO initiation. These conditions are based on the degradation for a period of one network performance metric, aka signal quality measure or a combination of many signal quality measures, like, signal strength, throughput, packet loss, etc.

Figure 2:
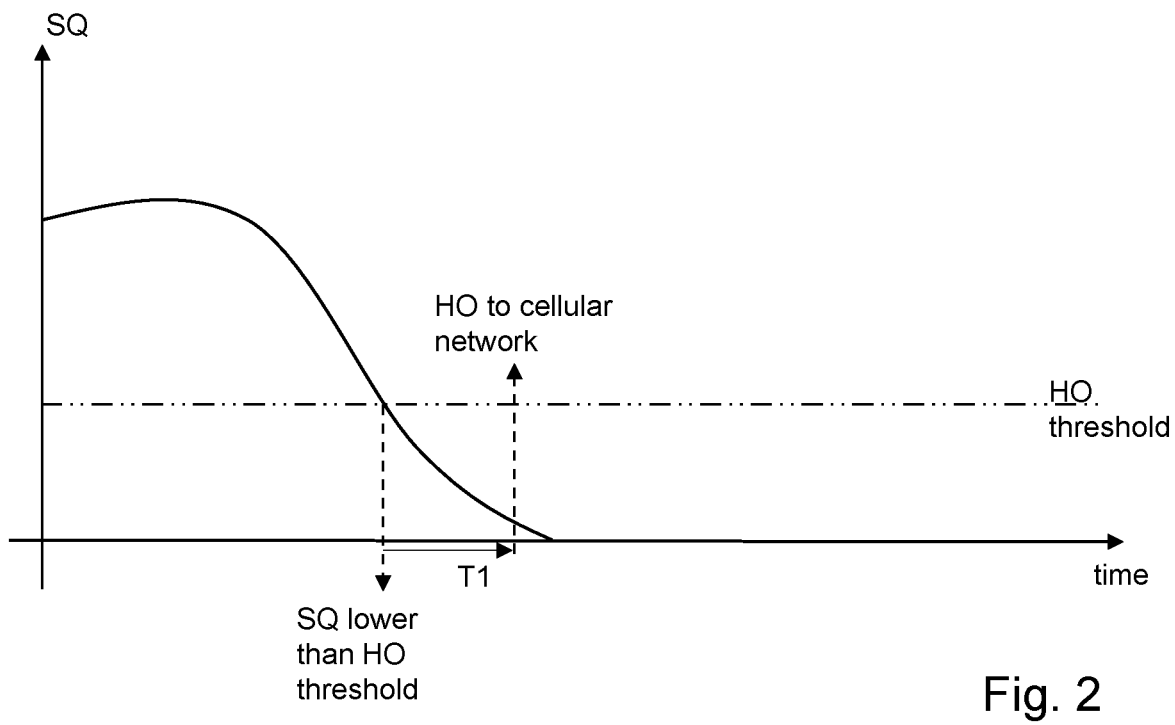
FIG. 2 is an x/y-diagram illustrating a prior art HO process from WLAN to cellular network over time when no band steering is used.

For a traditional WLAN-to-Cellular HO process, the process is controlled by the wireless device. A prior art procedure is illustrated in FIG. 2. To decide upon a HO, the wireless device 140 monitors a signal quality (SQ) measure of WLAN signals from the AP 120. If the WLAN signal quality measure keeps lower than a HO threshold for a specific period (T1), the wireless device 140 triggers the HO to the cellular network 100.

From the AP 120 perspective, when the AP 120 detects a wireless device 140 with poor performance, i.e. poor signal quality, some actions to improve the connectivity may take place, like band-steering. In general, the band-steering procedure is triggered prior a wireless device-controlled HO initiation. Sometimes the band-steering procedure results in the signal quality increasing and the wireless device 140 can stay connected to the AP 120, but in a different frequency band. Then the band-steering procedure is successful. However, the band-steering procedure may also result in "failure—missing", which is when the AP 120 loses contact with the wireless device 140, and "failure—not moved", which is when the wireless device 140 refuses the steering.

As an example, in a typical residential environment, over the day, an average of 20 events of the band-steering procedure may happen for each AP. For a managed WLAN network dataset with more than 6000 APs, the distribution of band-steering results varies, like depicted in FIG. 3.

Figure 3:
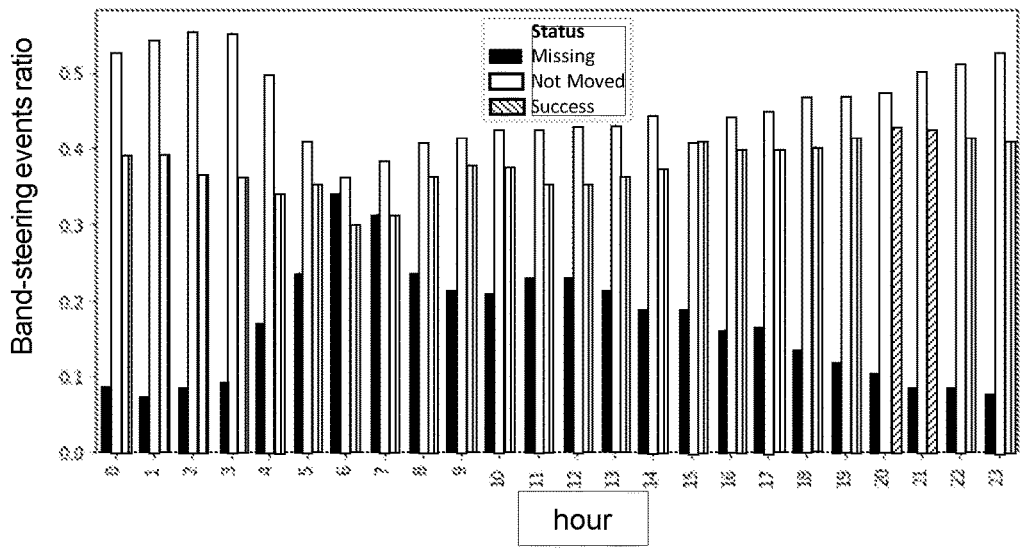
FIG. 3 is an x/y-diagram illustrating the outcome of a band steering procedure in ratio over time of day as extracted from 6000 APs.
Figure 4:
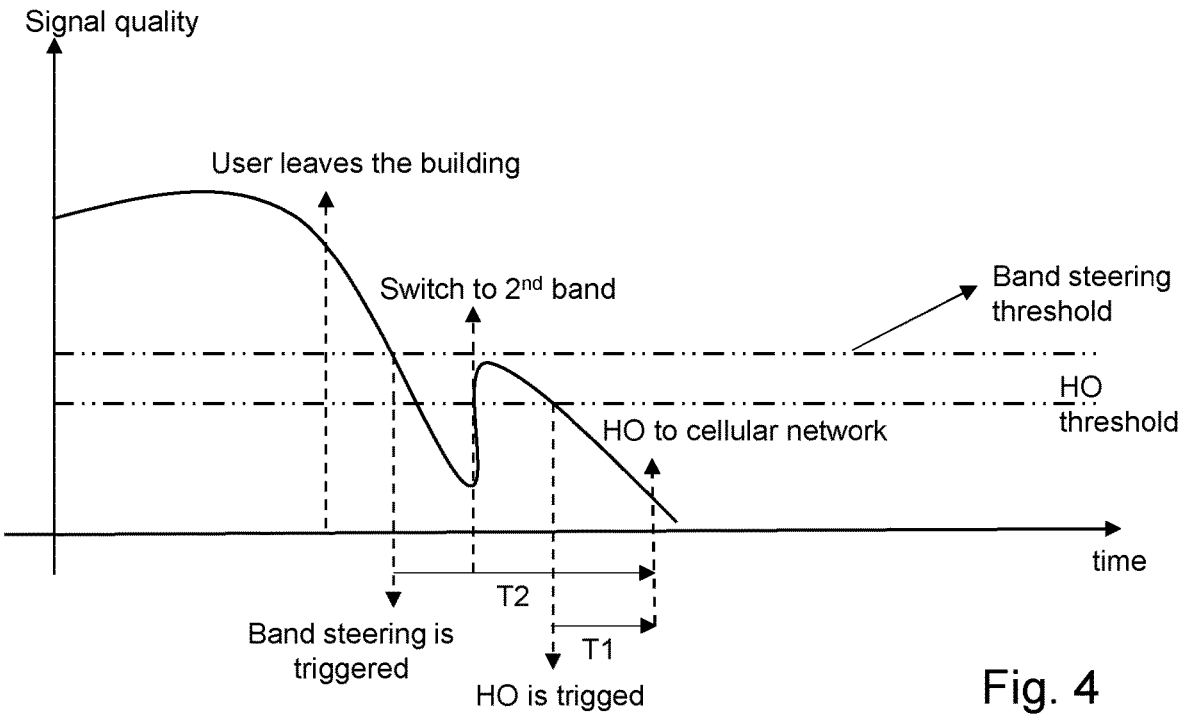
FIG. 4 is an x/y-diagram of a prior art HO process from WLAN to cellular network over time when band steering is applied.

From FIG. 3, the number of band-steering events related to "failure —missing" is significant in some time periods, mainly in the hours where the users are supposed to leave their houses, e.g. 6 am to 7 am, where they are connected to their residential WLAN. In the situations where bad WLAN connection is a result of the user leaving their houses, the time spent in the band-steering procedures is wasted, since the HO would happen anyhow, as illustrated in FIG. 4. As can be seen in FIG. 4, as the user leaves his/her home, WLAN signal quality decays with increased distance from home. Then when the signal quality becomes lower than the band steering threshold, band steering is triggered, and the wireless device is switched to a second WLAN band. As a result, the signal quality is temporarily increased. However, as the distance from home further increases, the signal quality will continue decaying until a HO to cellular network eventually takes place. In these situations, the wireless device would stay with limited connectivity over a second time (T2) which is even longer than the handover period T1 (see FIG. 1), until the HO to cellular network happens. This reduces the QoE of the user even more than when band steering is not used, even though a reason for band-steering was to improve the QoE. In situations like these, a method for improving the wireless device connectivity by anticipating the HO process by considering the usage pattern of a wireless device would be especially attractive as it can shorter the time that the wireless device has limited connectivity. Such a method is described in the following.

Figure 5:
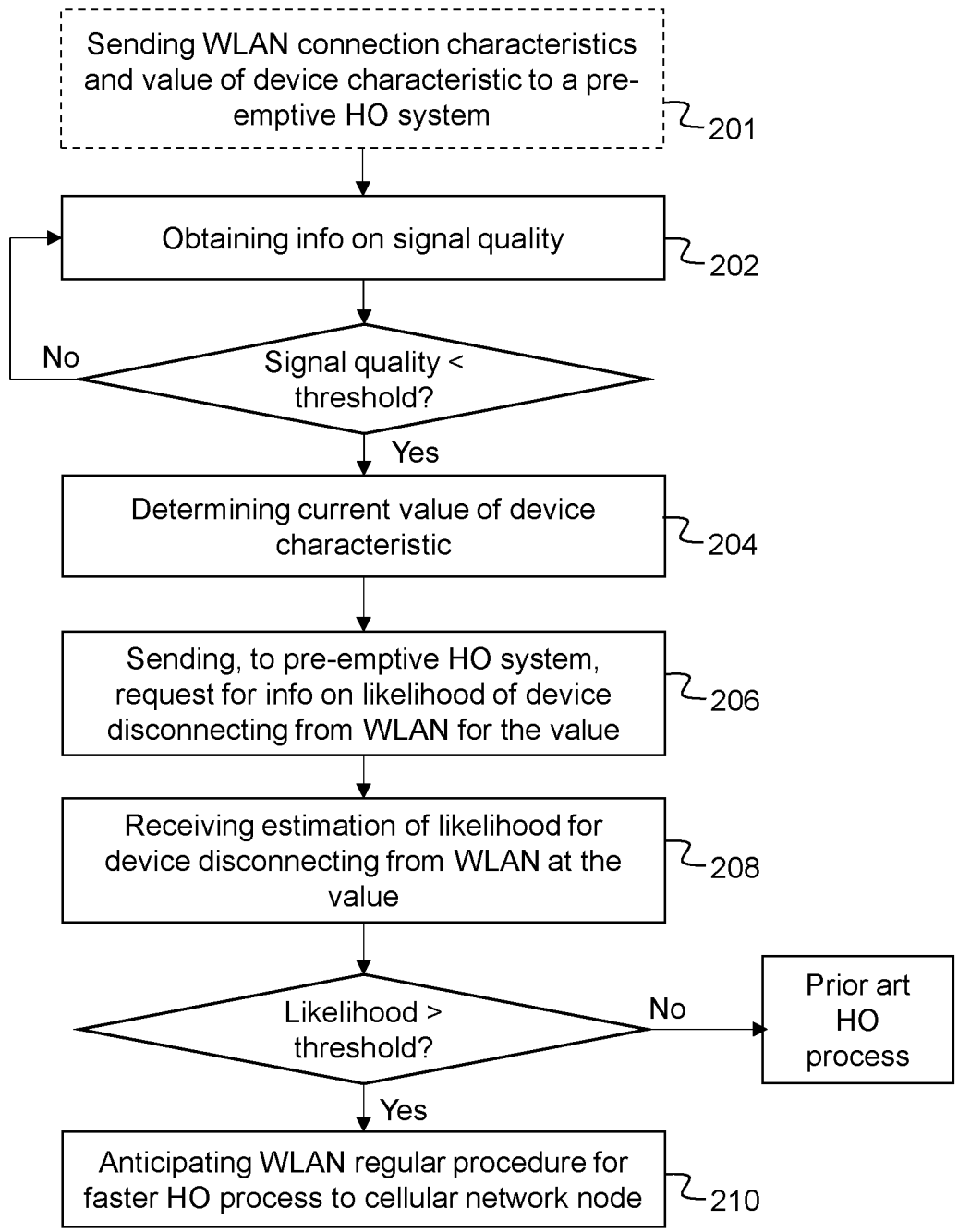
FIG. 5 is a flow chart illustrating a method performed by an access point of a WLAN, according to some possible embodiments.

FIG. 5, in conjunction with FIG. 1, describes a method performed by an AP 120 of a WLAN 125 for handling a wireless device 140 connected to the AP 120. The method comprises obtaining 202 information on signal quality of signals sent between the AP 120 and the wireless device 140, and when the obtained information on signal quality reveals that the signal quality is below a signal quality threshold, determining 204 a current value of a wireless device characteristic. The method further comprises sending 206, to a pre-emptive handover system 150, a request for information on likelihood of the wireless device 140 disconnecting from the WLAN 125 for the current value of the wireless device characteristic. The method further comprises receiving 208, from the pre-emptive handover system 150 and in response to the request, an estimation of the likelihood of the wireless device 140 disconnecting from the WLAN for the current value of the wireless device characteristic, wherein the likelihood was determined from statistical information of earlier handling of the wireless device 140 by the AP 120 for different values of the wireless device characteristics, and when the received estimation of likelihood is above a likelihood threshold, anticipating 210 WLAN regular procedures for a faster handover process of the wireless device 140 connection from the AP 120 to a network node 130 of a cellular communication network 100.

In other words, when the signal quality of signals between the AP 120 and the wireless device 140 falls below a quality threshold, the AP determines a value of a wireless device characteristic, which is a characteristic valid for the current wireless device and/or its WLAN connection. As an example, the wireless device characteristic may be time of day. The AP 120 then obtains from a pre-emptive handover system 150 a likelihood estimation that is based on earlier connections of the same wireless device where the value of the wireless device characteristic was substantially the same as the current value, i.e. the same or at least similar to the current value, for example the same or similar time of day. The likelihood estimation that the AP obtains from the system 150 is a statistical likelihood that the wireless device is disconnected from the WLAN for substantially the same value of the wireless device characteristic. When the statistical likelihood is above a certain likelihood threshold this is a sign that also this time there is a high probability that the wireless device is disconnected from the WLAN. Then, when the statistical likelihood is above the likelihood threshold, the AP anticipates regular WLAN proceedings for a faster handover process of the device to the network node of the cellular network. In other words, when the statistical likelihood is above the likelihood threshold, the AP accelerates the handover process of the wireless device so that the wireless device is connected earlier to a network node 130 of a cellular communication network 100 than would have been the case in a regular AP handling. With such a handling, the risk of the wireless device losing communication connection is lowered, as the wireless device is moved earlier to the cellular communication network than in prior art handover processes. Also, time spent in internal WLAN procedures to improve WLAN connection when there is low probability that it would help the device, such as band steering, is lowered. Hereby, the user experience is increased at the same time as WLAN resources are saved. Further, the AP controls the handover process to the cellular network but from the wireless device perspective the handover process seems to be device-controlled, as for prior art handover processes. In other words, no modifications are required at the wireless device.

"Signal quality" can be for example Signal strength i.e. Received Signal Strength Indicator (RSSI), packet loss, throughput, delay, Signal to Noise Ratio (SNR), etc. It can be the signal quality experienced at the wireless device on signals sent from the AP to the wireless device and/or the signal quality experienced at the AP on signals sent from the wireless device to the AP. The signal quality threshold may be the same or different from a band steering threshold. The pre-emptive handover system 150 can be situated anywhere in or outside of the cellular communication network 130. The pre-emptive handover system 150 may also be situated in the AP 120, In this case, the sending and receiving steps 206, 208 are performed within the AP.

According to an embodiment, the method further comprises a preamble stage before the obtaining 202 of information on signal quality. The preamble stage comprises sending 201, at a plurality of occasions, WLAN connection characteristics for the wireless device together with a current value of the wireless device characteristic to the pre-emptive handover system 150 so that the pre-emptive handover system can determine the likelihood of the wireless device 140 disconnecting from the WLAN 125. The WLAN connection characteristics indicate whether the WLAN connection for the wireless device was kept or lost in connection with the value of the wireless device characteristics. By such a sending of WLAN connection characteristics to the pre-emptive handover system, the pre-emptive handover system can determine the estimation of likelihood for different values of the wireless device characteristics. The WLAN connection characteristics may be sent more or less continuously, e.g. with regular time intervals, or the sending may be triggered by e.g. low signal quality values of signals sent between the AP and the wireless device, such as below the signal quality threshold. The WLAN connection information may be e.g. band-steering events, communication channel utilization, AP and/or wireless device download & upload throughput, and AP and/or wireless device packet loss.

According to another embodiment, the occasions when the WLAN connection characteristics are sent 201 are when the signal quality of signals sent between the AP and the wireless device are below a second threshold. By only sending the WLAN connection characteristics when the signal quality is below a certain second threshold, which may be the same as or different from the signal quality threshold, communication resources of the AP can be saved. As an alternative, WLAN connection characteristics are sent as soon as a WLAN connection characteristic change is registered, continuously or periodically.

According to another embodiment, the wireless device characteristic is one or more of: time of day; wireless device download rate; wireless device upload rate; usage of a communication channel between the communication device and the AP; usage of AP communication resources; i.e. number of wireless devices per AP frequency band; AP band steering events, signal quality degradation over time, or any other metric that can describe UE and AP usage patterns. As an example for the wireless device characteristic being time of day or communication channel usage, the method may work according to the following: When the signal quality obtained in 202 reveals that the signal quality, e.g. RSSI is below the signal quality threshold, determine that the time of day is e.g. 8 AM or that the communication channel is used to e.g. 80%. Then the AP requests from the preemptive handover system, the likelihood of the wireless device losing WLAN connection and changing to cellular at 8 AM or when the communication channel is used to 80%. When the likelihood is above a likelihood threshold of let us say 50% then anticipate the regular WLAN procedures to achieve a faster HO to the cellular network. Another example could be according to the following: When the signal quality obtained in 202 reveals that the signal quality is below the signal quality threshold, determine that the signal quality has dropped more than 40% percent in 30 seconds. Then the AP requests from the preemptive handover system the likelihood of the device losing WLAN connection and changing to cellular when signal quality dropped 40% in 30 seconds.

According to yet another embodiment, the anticipating 210 of WLAN regular procedures for a faster handover process of the wireless device 140 connection from the AP 120 to the cellular network node 130 comprises stopping sending acknowledgement (ACK) messages to the wireless device 140, sending a message to the wireless device 140 instructing the wireless device to handover to the cellular communication network 100, or avoiding moving the wireless device from a first WLAN radio frequency to a second WLAN radio frequency that is different from the first WLAN radio frequency. All those alternatives would result in a faster handover process to the cellular network compared to prior art, when the likelihood of the wireless device disconnecting from the WLAN is above the likelihood threshold. Sending an explicit message to the wireless device would imply a fast and directly triggered HO process, however, changes are required to the AP and to the device. The avoiding of moving the wireless device from a first WLAN radio frequency to a second WLAN radio frequency, i.e. band steering, requests no changes to the wireless device and shortens the HO time compared to prior art band steering. By stopping sending ACK messages, the UE gets the impression that the AP is lost and performs a quick HO process to cellular. Also in this case, no changes are required to the wireless device. The second WLAN radio frequency, to which the wireless device is avoided to be moved, could be either lower or higher than the first WLAN radio frequency.

Figure 6:
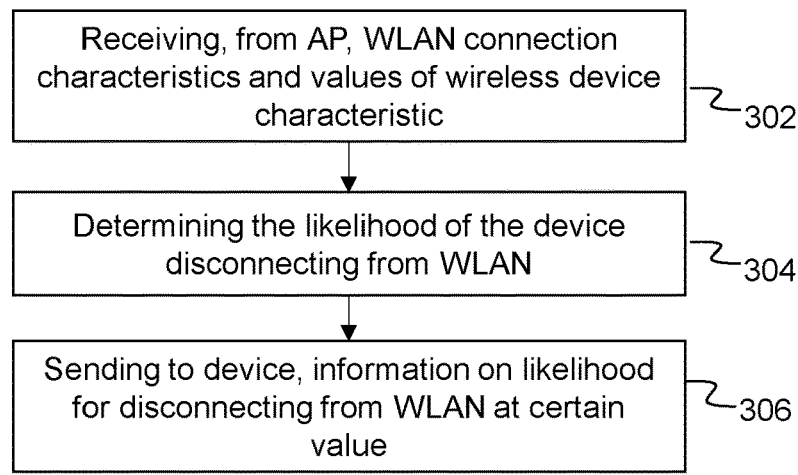
FIG. 6 is a flow chart illustrating a method performed by a preemptive HO system, according to possible embodiments.

FIG. 6, in conjunction with FIG. 1, describes a method performed by a pre-emptive handover system 150 for determining a likelihood of a wireless device 140 connected to an AP 120 of a WLAN 125 disconnecting from the WLAN 125. The method comprises receiving 302, from the AP 120 at each of a plurality of occasions, a value of a wireless device characteristic for the wireless device together with WLAN connection characteristics, indicating whether the WLAN connection of the wireless device was lost or kept in connection with the value of the wireless device characteristic. The method further comprises determining 304 the likelihood of the wireless device 140 disconnecting from the WLAN 125 for different values of the wireless device characteristic, based on the received WLAN connection characteristics and the values of the wireless device characteristic, and in response to a request from the AP 120 regarding a certain value of the wireless device characteristic, sending 306 to the AP, information on the determined likelihood of the wireless device 140 disconnecting from the WLAN 125 for the certain value.

In other words, the pre-emptive handover system determines the likelihood for this wireless device 140 disconnecting from the AP, from earlier handling of the device. I.e. when the wireless device characteristic was the same earlier on, did the wireless device then lose connection with the WLAN most times or was the WLAN connection kept? For the example that the wireless device characteristic is "time of day", the WLAN connection characteristics give the system information of whether the WLAN connection was kept or lost within a certain set time from the reported time of day, Based on the WLAN connection characteristics received for different wireless device characteristic values, the pre-emptive HO system 150 can determine this likelihood statistically. As the determination follows a statistical probability, the more WLAN connection characteristics the pre-emptive HO system has for a certain wireless device characteristic value, the better the determined likelihood. The pre-emptive handover system 150 may be situated in the AP 120 or it may be a separate node situated anywhere in a telecom, such as in such as in an Operation and Support System (OSS) or in a datacom system. Alternatively, the system may comprise functionality spread out over different nodes or networks, also called a cloud solution.

According to an embodiment, the wireless device characteristic is one or more of: time of day; wireless device download rate; wireless device upload rate; usage of a communication channel between the communication device and the AP; usage of AP communication resources; AP band steering events, AP Clients per Band, or any other metric that can describe UE and AP usage patterns.

According to another embodiment, the method further comprising receiving, from other APs at each of a plurality of occasions, a value of a wireless device characteristic for other wireless devices together with WLAN connection characteristics indicating whether the WLAN connection of the other wireless devices were lost or kept in connection with the value of the wireless device characteristic. Further, the determining 304 of the likelihood of the wireless device 140 disconnecting from the WLAN 125 for different values of the wireless device characteristic, is based also on the received WLAN connection characteristics and the values of the wireless device characteristic of the other wireless devices.

Most wireless device characteristics have similarities for different wireless devices and/or APs. When it comes the wireless device characteristic "Time of day" for example, people tend to for example get up and go to work at similar times of day. By analyzing data from many APs and/or many different wireless devices more statistical measurements can be achieved and therefore the likelihood can be determined more statistically reliable. Also, a wireless device may change its behavior for the first time ever, but the same behavior may have been already known from other wireless devices connected to other APs. For example, social distancing due a pandemic started earlier in Europe than in Brazil. Then people and their wireless devices started to stay at home more of the time. The Preemptive HO system could learn this pattern from Europe, and when a wireless device in Brazil starts to exhibit the same pattern, the preemptive handover system knows that the device is unlikely to disconnect from the AP earlier than would have been the case if the preemptive HO system only gets information for the one wireless device and the connection to its home AP.

Figure 7:
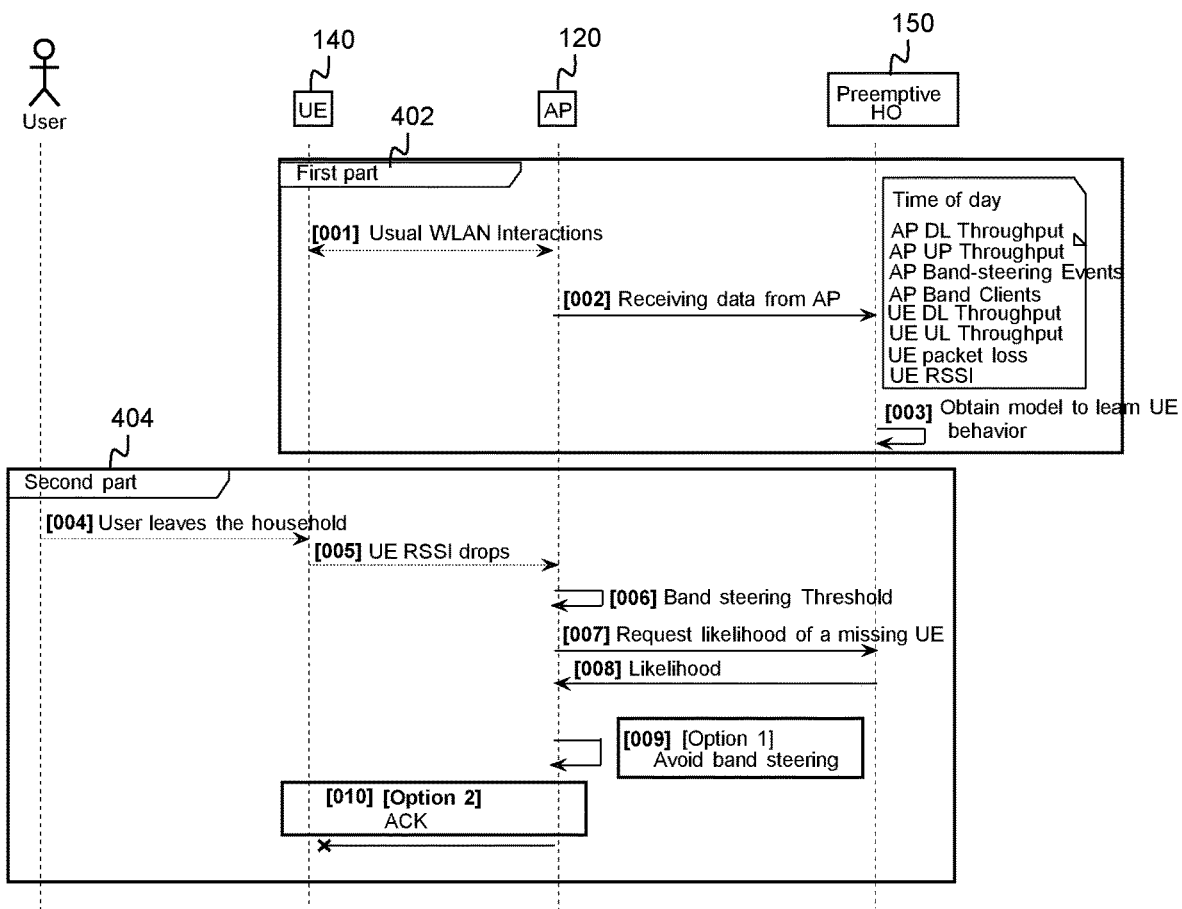
FIG. 7 is a signaling diagram illustrating an example of a procedure when the solution is used, according to further possible embodiments.

FIG. 7 describes a sequence diagram of embodiments of the invention. Briefly, the method has a first part 402 in which a statistical model of wireless device usage/user behavior is obtained and a second part 404 when the output of the statistical model is used to trigger some actions in the AP.

The first part 402 is model training, which is responsible for building a user behavior model. The first part 402 starts with the Preemptive HO system 150 receiving (002) data, i.e. WLAN connection characteristics and a thereto connected wireless device characteristic value, from the AP 120, for the wireless device (UE) 140. The wireless device characteristic is in the following exemplified by Time of day. The received data is composed of a set of WLAN connection characteristic measurements already available in the AP from usual WLAN interactions (001): AP download & upload Throughput, Packet Loss, Band-steering Events, Bands, noise, channel utilization, and UE download & upload Throughput, packet loss, RSSI, as well as the time of day when those measurements were made. Information like Medium Access Control (MAC) addresses are not necessary for the Preemptive HO component. It can be replaced by any other unique device identifier that can protect privacy.

After collecting data from one or many APs and doing any possible transformations such as category encoding, normalization and filtering, the Preemptive HO system 150 starts to obtain (003) the user behavior model. This model predicts the likelihood of the UE 140 disconnecting from the AP 120 at different times of day. The user behavior model may be updated/improved during use, as the more data in the model, the better the predictions.

With the already collected data, the preemptive HO system 150 builds the likelihood of the UE 140 connecting from the AP 120 depending on time of day. This likelihood represents when the UE 140 statistically gets disconnected from both AP's frequency bands (in case the AP 120 has two bands), depending on time of day. WLAN connection characteristics like the list of connected UEs and band steering events with "Missing" status may be used to create the likelihood. "List of connected UEs" may be of interest when the user has more than one wireless device connected to the AP. For example, if the user has an e-book reader and a mobile phone, it is likely that the mobile phone has a better signal reception ability than the e-book reader. Then information on the e-book reader being disconnected from the AP could be of great interest as then it is likely that the mobile phone is also disconnected from the AP within shortly. Hereby, a model is trained using input information from earlier AP handling of the wireless device. The user behavior model can be obtained using any traditional machine learning algorithm like artificial neural networks, logistic regression, tree methods, ensembles, support vector machines, etc.

After training, the second part 404 of the method starts. Here the model provides if a given pattern, i.e. the input variables collected from the AP, is likely to disconnect the UE from the AP in the next time-steps. Later, the AP may use this information to save resources by avoiding band-steering events or speeding-up the HO the cellular network.

In the second part 404, the AP 120 monitors the WLAN connection characteristics of the connected wireless device 140, as in usual WLAN handling of wireless devices. In FIG. 7, an example is shown where the user leaves (004) a household covered by the AP 140. As the user leaves the household, the RSSI detected by the UE 140 drops. The UE 140 sends (005) the information of RSSI level to the AP 120. When the AP 120 detects (006) that the received RSSI level is below an RSSI threshold, which here is exemplified by a band steering threshold, the AP 120 requests (007) from the Preemptive HO system 150 the likelihood for the UE 140 to disconnect from the AP for this time of day. If the likelihood as determined by the first module of the preemptive HO system 150 and sent to the AP (008) in response to the request, is above a likelihood threshold that represents a high chance of the UE 140 being disconnected from the AP, the AP takes actions (009) or (010) for accelerating the HO process to the cellular network. In other words, the AP anticipates WLAN regular procedures for a faster handover process of the UE 140 connection from the AP 120 to a network node of a cellular communication network.

In the embodiment of FIG. 7, two options of such actions are shown. In the first option, band steering is avoided (009) by the AP 120. By avoiding the band steering, the measured RSSI does not improve, as opposed to in the prior art handling of FIG. 4, but keeps degrading until the UE 140 reaches an RSSI level where it makes a HO decision to cellular, as in regular UE handling. As a result, the HO to cellular is performed faster than for prior art, and the user leaving the household in (004) is most probably having a higher QoE than for prior art.

Figure 8:
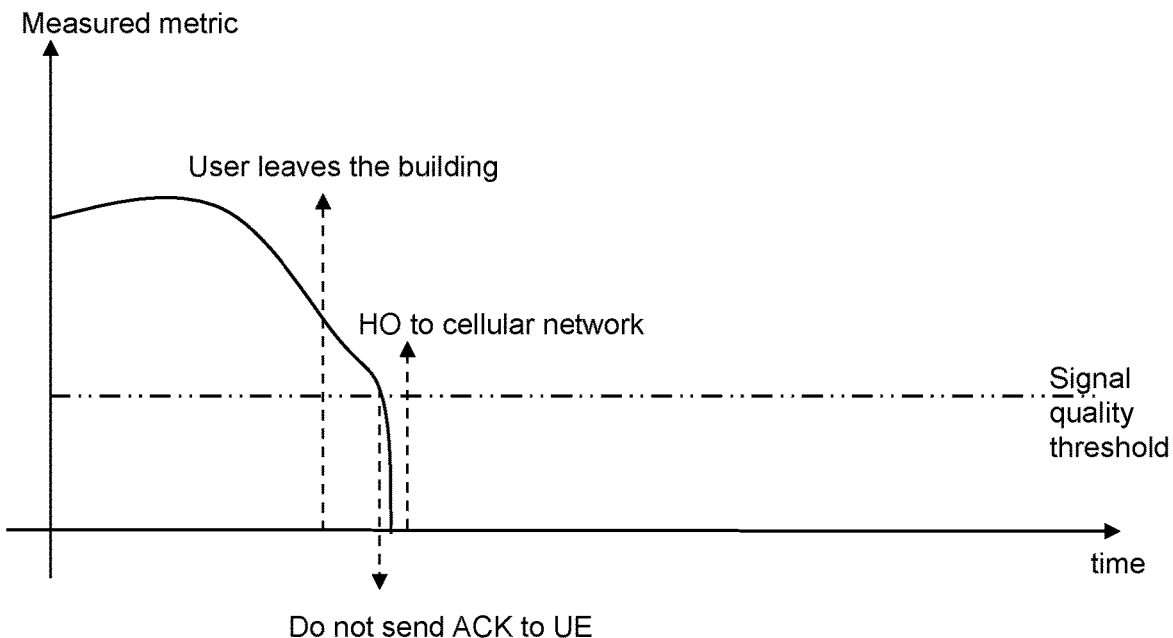
FIG. 8 is an x/y-diagram of a HO process from WLAN to cellular over time for a possible embodiment.

In the second option, the AP stops sending acknowledgements (ACKs) (010) to the UE in order to accelerate the HO process to cellular. Hereby resources in the AP are saved and it leads to a quicker HO for the UE 140. This is illustrated in FIG. 8. When the UE 140 does not receive any ACKs from the AP 120, the UE perceives it as it has lost contact with the AP, i.e. the signal quality has dropped to zero, and the UE initiates the HO to cellular more or less directly. As the second option is independent of any band steering events, the decision to stop sending ACKs can be entirely dependent on the Preemptive HO system 150. In this implementation, the AP 120 would request the likelihood from the Preemptive HO system when the RSSI drops below the signal quality threshold and stop sending ACKs to the UE if a high likelihood is received.

Figure 9:
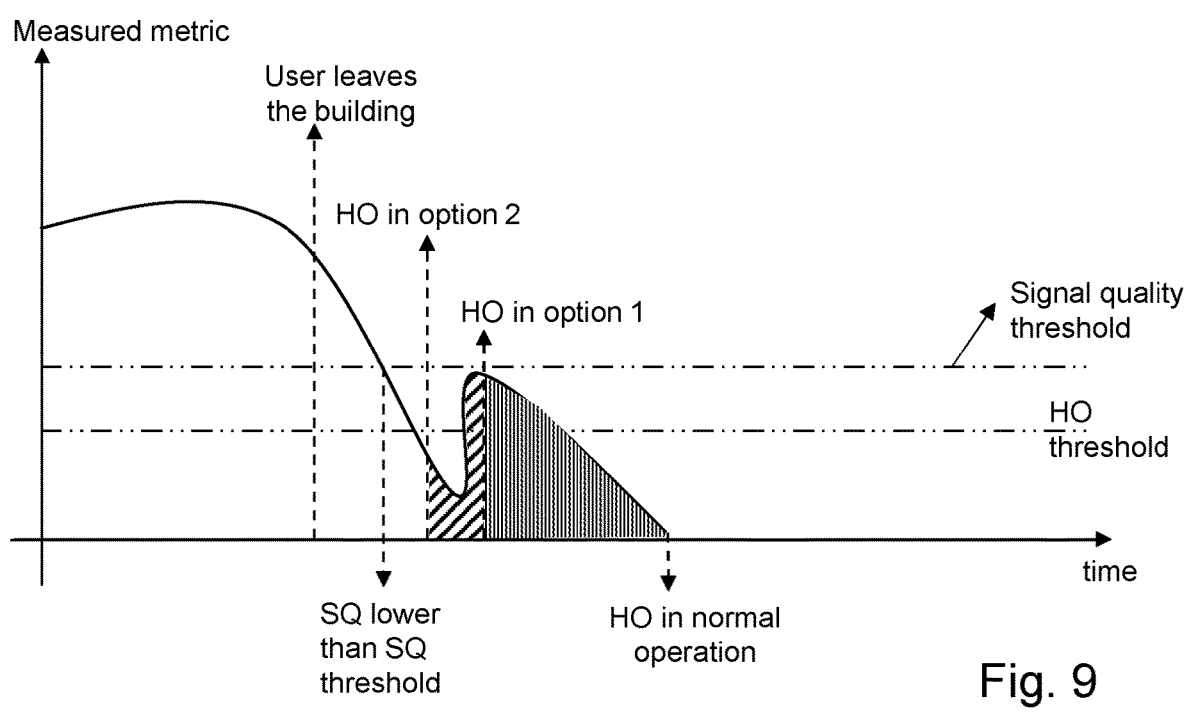
FIG. 9 is an x/y-diagram of a HO process from WLAN to cellular over time for possible embodiments illustrating time gain compared to prior art.

The first and second options described above have different levels of complexity to be implemented. The first option may not require any modification in the AP firmware as it can be done by remotely disabling the band steering for the UE in question in a given period. On the other hand, the second option demands some modification in the AP firmware to not sending ACKs to the UE in question. Anyhow, both the first and second option allow the UE to switch rapidly to a cellular network, thus reducing time periods with none or limited wireless connection. The reduced times are shown in FIG. 9. The vertical striped area shows the reduced time for option 1 and the vertical striped area plus the slanted striped area show the reduced time for option 2.

A third option for taking actions for accelerating the HO process to the cellular network is for the AP 120 to send an instruction to the UE 140 to handover to the cellular network when the received likelihood (008) of FIG. 7 is above the likelihood threshold. This will result in a quick handover to cellular network and a high QoE for the cases where the UE would have lost WLAN connection anyhow. However, such an active instruction would need changes in both the AP 120, for initiating such a message and in the UE 140, for being able to handle such a new message.

As indicated, and according to an embodiment, the Preemptive HO system 150 can be split into two modules, a training part performing the first part 402 of the method and an inference part 404 performing the second part 404 of the method. These modules can be located anywhere, including the AP or an Operations Support System (OSS), and may or may not be co-located. The OSS may be independent to the WLAN and the cellular network, it may belong to any of the two networks or it may be shared between the two networks. One or both modules of the Preemptive HO system 150 can be allocated either close to the AP or close to the OSS, or one or both of the modules may be centralized or distributed.

Performance evaluation. According to experiments described in [1], the mean time before making a traditional handover decision can vary significantly depending on the metric under consideration: (75.0±28.5) seconds for a setup with limited throughput, (95.9±71.7) seconds for a setup with added delay and (35.1±23.6) seconds for a setup with packet loss. In most of the analyzed scenarios it takes more than a minute for the wireless device to handover, and there is quite a high variation in how long it takes from the network performance becomes poor and until handover is initiated.

As embodiments of the proposed solution prevent the connection metrics to the AP from fluctuating at times, we can infer that it always tends towards the shortest possible HO time, or even lower, since the proposed solution can still remove the wasted time in the HO process. For performance evaluation purposes, we will assume, for simplicity, that the HO time is equal to the shortest possible HO time. In this way, the maximum HO time gain for each metric, considering the numbers provided in [1], is:

Maximum HO time gain (throughput): (28.5/75.0)*100=38%

Maximum HO time gain (delay): (71.7/95.9)*100=75%

Maximum HO time gain (packet loss): (23.6/35.1)*100=67%

Figure 10:
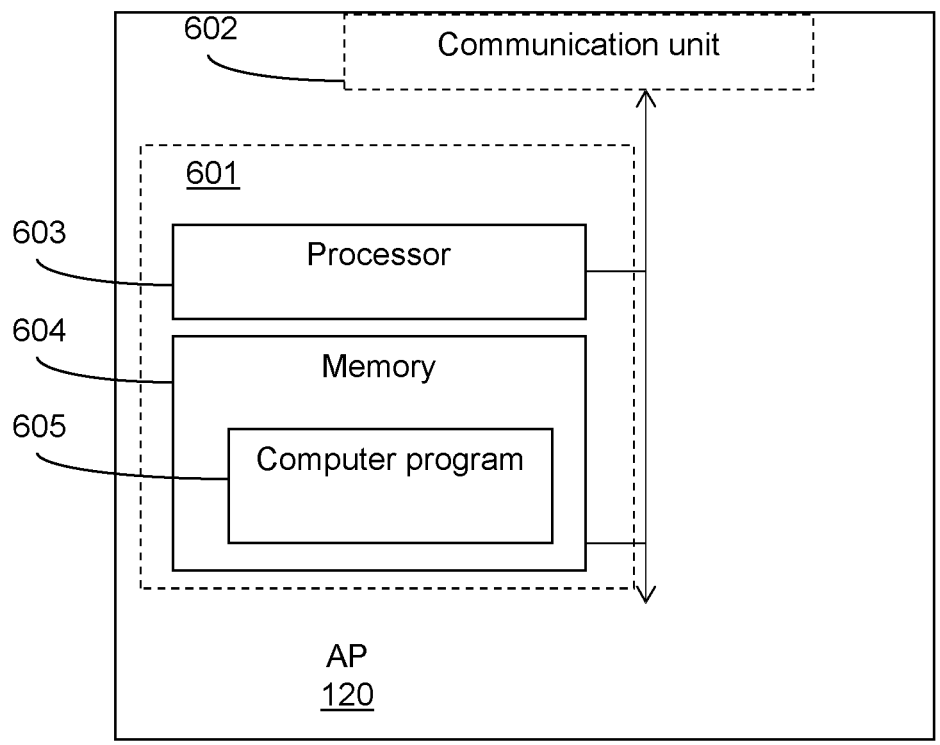
FIG. 10 is a block diagram illustrating an AP in more detail, according to further possible embodiments.

FIG. 10, in conjunction with FIG. 1, describes an AP 120 operable in a WLAN 125, the AP being configured for handling a wireless device 140 connected to the AP 120. The AP 120 comprises a processing circuitry 603 and a memory 604. Said memory contains instructions executable by said processing circuitry, whereby the AP 120 is operative for obtaining information on signal quality of signals sent between the AP 120 and the wireless device 140, and when the obtained information on signal quality reveals that the signal quality is below a signal quality threshold, determining a current value of a wireless device characteristic. The AP is further operative for sending, to a pre-emptive handover system 150, a request for information on likelihood of the wireless device 140 disconnecting from the WLAN 125 for the current value of the wireless device characteristic, and receiving, from the pre-emptive handover system 150 and in response to the request, an estimation of the likelihood of the wireless device 140 disconnecting from the WLAN for the current value of the wireless device characteristic, wherein the likelihood was determined from statistical information of earlier handling of the wireless device 140 by the AP 120 for different values of the wireless device characteristics. Further, the AP is operative for, when the received estimation of likelihood is above a likelihood threshold, anticipating WLAN regular procedures for a faster handover process of the wireless device 140 connection from the AP 120 to a network node 130 of a cellular communication network 100.

According to an embodiment, the AP 120 is further operative for performing a preamble stage before the obtaining of information on signal quality. The preamble stage comprises sending, at a plurality of occasions, WLAN connection characteristics for the wireless device together with a current value of the wireless device characteristic to the pre-emptive handover system 150 so that the pre-emptive handover system can determine the likelihood of the wireless device 140 disconnecting from the WLAN 125. The WLAN connection characteristics indicate whether the WLAN connection for the wireless device was kept or lost in connection with the value of the wireless device characteristics.

According to another embodiment, the occasions when the AP 120 is operative for sending the WLAN connection characteristics are when the signal quality of signals sent between the AP and the wireless device are below a second threshold.

According to another embodiment, the wireless device characteristic is one or more of: time of day, wireless device download rate, wireless device upload rate, usage of a communication channel between the communication device and the AP, usage of AP communication resources, AP band steering events, signal quality degradation over time, or any other metric that can describe UE and AP usage patterns.

According to another embodiment, the AP 120 is operative for the anticipating of WLAN regular procedures for a faster handover process of the wireless device 140 connection from the AP 120 to the cellular network node 130 by stopping sending acknowledgement messages to the wireless device 140, sending a message to the wireless device 140 instructing the wireless device to handover to the cellular communication network 100 or avoiding moving the wireless device from a first WLAN radio frequency to a second WLAN radio frequency that is different from the first WLAN radio frequency.

According to other embodiments, the AP 120 may further comprise a communication unit 602, which may be considered to comprise conventional means for wireless communication with the wireless device 140, such as a transceiver for wireless transmission and reception of signals in the communication network. The communication unit 602 may also comprise conventional means for communication with nodes of the WLAN and with systems such as the preemptive handover system 150. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the AP 120 to perform the steps described in any of the described embodiments of the AP 120 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the AP 120 has access via the communication unit 602. The computer program 605 may then be downloaded from the server into the memory 604.

Figure 11:
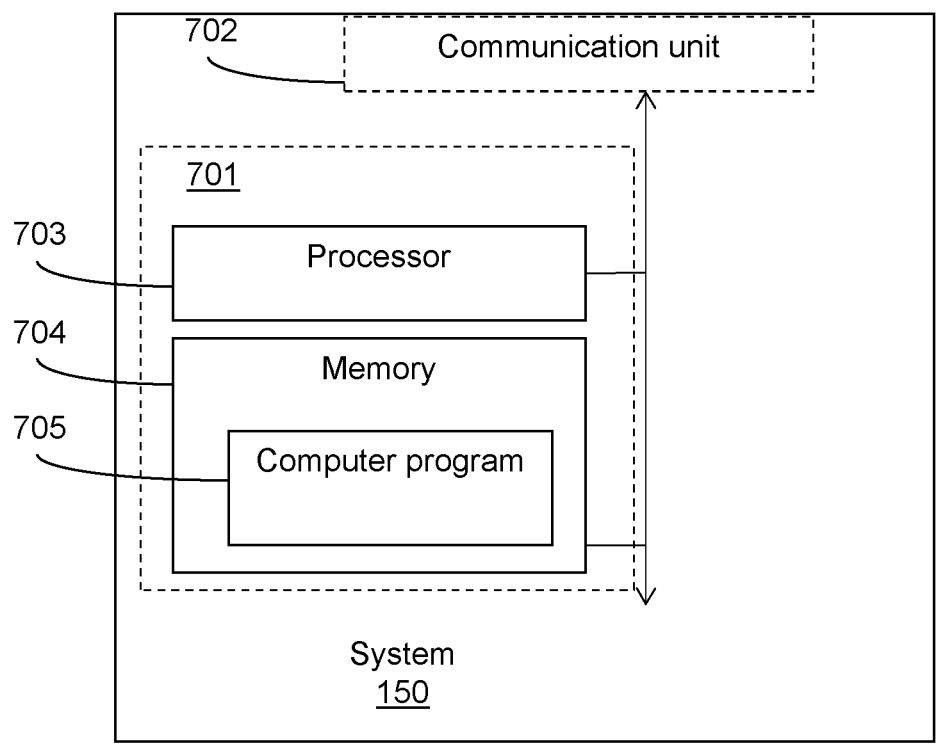
FIG. 11 is a block diagram illustrating a preemptive HO system in more detail, according to further possible embodiments

FIG. 11, in conjunction with FIG. 1, shows a pre-emptive handover system 150 configured for determining a likelihood of a wireless device 140 connected to an AP 120 of a WLAN 125 disconnecting from the WLAN 125. The pre-emptive handover system 150 comprises a processing circuitry 703 and a memory 704. Said memory contains instructions executable by said processing circuitry, whereby the pre-emptive handover system 150 is operative for receiving, from the AP 120 at each of a plurality of occasions, a value of a wireless device characteristic for the wireless device together with WLAN connection characteristics indicating whether the WLAN connection of the wireless device was lost or kept in connection with the value of the wireless device characteristic, determining the likelihood of the wireless device 140 disconnecting from the WLAN 125 for different values of the wireless device characteristic, based on the received WLAN connection characteristics and the values of the wireless device characteristic, and in response to a request from the AP regarding a certain value of the wireless device characteristic, sending to the AP 120, information on the determined likelihood of the wireless device 140 disconnecting from the WLAN 125 for the certain value.

According to an embodiment, the wireless device characteristic is one or more of: time of day; wireless device download rate; wireless device upload rate; usage of a communication channel between the communication device and the AP; usage of AP communication resources; AP band steering events, signal quality degradation over time, or any other metric that can describe UE and AP usage patterns.

According to another embodiment, the pre-emptive handover system 150 is further operative for receiving, from other APs at each of a plurality of occasions, a value of a wireless device characteristic for other wireless devices together with WLAN connection characteristics indicating whether the WLAN connection of the other wireless devices were lost or kept in connection with the value of the wireless device characteristic. Further, the pre-emptive handover system 150 is operative for the determining of the likelihood of the wireless device 140 disconnecting from the WLAN 125 for different values of the wireless device characteristic based also on the received WLAN connection characteristics and the values of the wireless device characteristic of the other wireless devices.

According to other embodiments, the pre-emptive handover system 150 may further comprise a communication unit 702, which may be considered to comprise conventional means for communication with nodes of the WLAN, such as the AP 120. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the pre-emptive handover system 150 to perform the steps described in any of the described embodiments of the pre-emptive handover system 150 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD, or flash memory, from which the program could be downloaded into the memory 704. Alternatively, the computer program may be stored on a server or any other entity to which the pre-emptive handover system 1500 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by an access point (AP) of a wireless local area network (WLAN) for handling a wireless device connected to the AP, the method comprising:
    obtaining information on signal quality of signals sent between the AP and the wireless device;
    when the obtained information on signal quality reveals that the signal quality is below a signal quality threshold, determining a current value of a wireless device characteristic;
    sending, to a pre-emptive handover system, a request for information on likelihood of the wireless device disconnecting from the WLAN for the current value of the wireless device characteristic;
    receiving, from the pre-emptive handover system and in response to the request, an estimation of the likelihood of the wireless device disconnecting from the WLAN for the current value of the wireless device characteristic, wherein the likelihood was determined from statistical information of earlier handling of the wireless device by the AP for different values of the wireless device characteristics; and
    when the received estimation of likelihood is above a likelihood threshold, anticipating WLAN regular procedures for a faster handover process of the wireless device connection from the AP to a network node of a cellular communication network.

2. The method of claim 1, further comprising, before the obtaining of information on signal quality:
    sending, at a plurality of occasions, WLAN connection characteristics for the wireless device together with a current value of the wireless device characteristic to the pre-emptive handover system so that the pre-emptive handover system can determine the likelihood of the wireless device disconnecting from the WLAN, the WLAN connection characteristics indicating whether the WLAN connection for the wireless device was kept or lost in connection with the value of the wireless device characteristics.

3. The method of claim 2, wherein the occasions when the WLAN connection characteristics are sent are when the signal quality of signals sent between the AP and the wireless device are below a second threshold.

4. The method of claim 1, wherein the wireless device characteristic is one or more of: time of day, wireless device download rate, wireless device upload rate, usage of a communication channel between the communication device and the AP, usage of AP communication resources, AP band steering events, signal quality degradation over time.

5. The method of claim 1, wherein the anticipating of WLAN regular procedures for a faster handover process of the wireless device connection from the AP to the cellular network node comprises stopping sending acknowledgement messages to the wireless device, sending a message to the wireless device instructing the wireless device to handover to the cellular communication network, or avoiding moving the wireless device from a first WLAN radio frequency to a second WLAN radio frequency that is different from the first WLAN radio frequency.

6. A method performed by a pre-emptive handover system for determining a likelihood of a wireless device connected to an access point (AP) of a wireless local-area network (WLAN) disconnecting from the WLAN, the method comprising:
    receiving, from the AP at each of a plurality of occasions, a value of a wireless device characteristic for the wireless device together with WLAN connection characteristics indicating whether the WLAN connection of the wireless device was lost or kept in connection with the value of the wireless device characteristic,
    determining the likelihood of the wireless device disconnecting from the WLAN for different values of the wireless device characteristic, based on the received WLAN connection characteristics and the values of the wireless device characteristic, and
    in response to a request from the AP regarding a certain value of the wireless device characteristic, sending to the AP, information on the determined likelihood of the wireless device disconnecting from the WLAN for the certain value.

7. The method of claim 6, wherein the wireless device characteristic is one or more of: time of day; wireless device download rate; wireless device upload rate; usage of a communication channel between the communication device and the AP; usage of AP communication resources; AP band steering events, signal quality degradation over time.

8. The method of claim 6, further comprising receiving, from other APs at each of a plurality of occasions, a value of a wireless device characteristic for other wireless devices together with WLAN connection characteristics indicating whether the WLAN connection of the other wireless devices were lost or kept in connection with the value of the wireless device characteristic, and wherein the determining of the likelihood of the wireless device disconnecting from the WLAN for different values of the wireless device characteristic, is based also on the received WLAN connection characteristics and the values of the wireless device characteristic of the other wireless devices.

9. An access point (AP) operable in a wireless local-area network (WLAN), configured for handling a wireless device connected to the AP, the AP comprising a processing circuitry and a memory, said memory containing instructions executable by said processing circuitry, whereby the AP is configured to:
    obtain information on signal quality of signals sent between the AP and the wireless device;
    when the obtained information on signal quality reveals that the signal quality is below a signal quality threshold, determine a current value of a wireless device characteristic;
    send, to a pre-emptive handover system, a request for information on likelihood of the wireless device disconnecting from the WLAN for the current value of the wireless device characteristic;

receive, from the pre-emptive handover system and in response to the request, an estimation of the likelihood of the wireless device disconnecting from the WLAN for the current value of the wireless device characteristic, wherein the likelihood was determined from statistical information of earlier handling of the wireless device by the AP for different values of the wireless device characteristics; and when the received estimation of likelihood is above a likelihood threshold, anticipate WLAN regular procedures for a faster handover process of the wireless device connection from the AP to a network node of a cellular communication network.

10. The AP of claim 9, further configured to, before the obtaining of information on signal quality:

send, at a plurality of occasions, WLAN connection characteristics for the wireless device together with a current value of the wireless device characteristic to the pre-emptive handover system so that the pre-emptive handover system can determine the likelihood of the wireless device disconnecting from the WLAN, the WLAN connection characteristics indicating whether the WLAN connection for the wireless device was kept or lost in connection with the value of the wireless device characteristics.

11. The AP of claim 10, wherein the plurality of occasions are when the signal quality of signals sent between the AP and the wireless device are below a second threshold.

12. The AP of claim 9, wherein the wireless device characteristic is one or more of: time of day, wireless device download rate, wireless device upload rate, usage of a communication channel between the communication device and the AP, usage of AP communication resources, AP band steering events, signal quality degradation over time.

13. The AP of claim 9, wherein the AP is configured to anticipate the WLAN regular procedures for a faster handover process of the wireless device connection from the AP to the cellular network node by stopping sending acknowledgement messages to the wireless device, sending a message to the wireless device instructing the wireless device to handover to the cellular communication network, or avoiding moving the wireless device from a first WLAN radio frequency to a second WLAN radio frequency that is different from the first WLAN radio frequency.

14. A pre-emptive handover system configured for determining a likelihood of a wireless device connected to an access point (AP) of a WLAN disconnecting from the WLAN, the pre-emptive handover system comprising a processing circuitry and a memory, said memory containing instructions executable by said processing circuitry, whereby the pre-emptive handover system is configured to:

receive, from the AP at each of a plurality of occasions, a value of a wireless device characteristic for the wireless device together with WLAN connection characteristics indicating whether the WLAN connection of the wireless device was lost or kept in connection with the value of the wireless device characteristic, determine the likelihood of the wireless device disconnecting from the WLAN for different values of the wireless device characteristic, based on the received WLAN connection characteristics and the values of the wireless device characteristic, and in response to a request from the AP regarding a certain value of the wireless device characteristic, send to the AP, information on the determined likelihood of the wireless device disconnecting from the WLAN for the certain value.

15. The pre-emptive handover system of claim 14, wherein the wireless device characteristic is one or more of: time of day; wireless device download rate; wireless device upload rate; usage of a communication channel between the communication device and the AP; usage of AP communication resources; AP band steering events, signal quality degradation over time, or any other metric that can describe UE and AP usage patterns.

16. The pre-emptive handover system of claim 14, further configured to receive, from other APs at each of a plurality of occasions, a value of a wireless device characteristic for other wireless devices together with WLAN connection characteristics indicating whether the WLAN connection of the other wireless devices were lost or kept in connection with the value of the wireless device characteristic, and wherein the pre-emptive handover system is configured to determine the likelihood of the wireless device disconnecting from the WLAN for different values of the wireless device characteristic based also on the received WLAN connection characteristics and the values of the wireless device characteristic of the other wireless devices.

* * * * *